United States Patent [19]

Borman et al.

[11] Patent Number: 4,593,077

[45] Date of Patent: Jun. 3, 1986

[54] PROCESS OF MAKING A HIGH MELT VISCOSITY BLOCK COPOLYESTER

[75] Inventors: Willem F. H. Borman, Evansville, Ind.; Donald I. Craft; Morton Kramer, both of Pittsfield, Mass.

[73] Assignee: General Electric Company, Pittsfield, Mass.

[21] Appl. No.: 714,057

[22] Filed: Mar. 20, 1985

Related U.S. Application Data

[63] Continuation of Ser. No. 215,020, Dec. 10, 1980, abandoned, which is a continuation of Ser. No. 803,966, Jun. 6, 1977, abandoned, which is a continuation of Ser. No. 564,128, Apr. 1, 1975, Pat. No. 4,069,278.

[51] Int. Cl.$^4$ .............................................. C08L 67/02
[52] U.S. Cl. ................................................... 525/444
[58] Field of Search ......................................... 525/444

[56] References Cited

U.S. PATENT DOCUMENTS

| | | | |
|---|---|---|---|
| 3,466,348 | 9/1969 | Wiener | 260/860 |
| 3,756,990 | 9/1973 | Jaeger | 260/860 |
| 4,069,278 | 1/1978 | Borman et al. | |

*Primary Examiner*—Paul R. Michl
*Attorney, Agent, or Firm*—Hedman, Gibson, Costigan & Hoare

[57] ABSTRACT

A novel process is disclosed for preparing a high melt viscosity block co-polyester of at least two different linear polyesters. The process comprises melt blending the polyesters and, thereafter, subjecting the melt blended polyesters to a temperature of 10°–50° C. below the melting point of the lowest melting ingredient in the blend until the melt viscosity has increased to at least 10,000 poises at a temperature 10°–15° C. above the melting point of the blend.

2 Claims, No Drawings

PROCESS OF MAKING A HIGH MELT VISCOSITY BLOCK COPOLYESTER

This is a continuation of application Ser. No. 215,020 filed Dec. 10, 1980, now abandoned, which is a continuation of Ser. No. 803,966, filed June 6, 1977, now abandoned, which is a continuation of Ser. No. 564,128, filed Apr. 1, 1975, now U.S. Pat. No. 4,069,278.

This invention relates to a process for preparing a high melt viscosity block co-polyester of at least two different linear polyesters which is based on melt blending the polyesters and, thereafter, subjecting the melt blended polyesters to a temperature of 10°–50° C. below the melting point of the lowest melting ingredient in the blend until the melt viscosity has increased to at least 10,000 poises at a temperature 10°–15° C. above the melting point of the blend.

BACKGROUND OF THE INVENTION

High melt viscosity is a requirement for certain thermoplastic fabrication techniques such as extrusion blow molding, injection blow molding, profile extrusion, pipe extrusion, blown film extrusion, co-extrusion (with a second plastic material) extrusion coating, foam extrusion, foam molding, thermoforming, and the like, all require the thermoplastic composition to have a high melt viscosity and melt strength (melt elasticity) during processing.

Blow molding is used to make hollow shaped plastic articles in a variety of commonly encountered forms, such as milk bottles, auto windshield washer tanks, street light globes arms and legs on toy dolls, and a multitude of others. These are two basic types of blow molding processes, both being fundamentally related, but technologically dissimilar. Extrusion blow molding typically comprises extruding a tube of plastic into a water-cooled mold, inflating the tube by internally introducing air or another gas until the walls of the molten tube assume the shape of the mold, allowing the shaped tube to cool to structural ridigity, and removing the extrusion blow molded part from the mold.

Another technique, injection blow molding involves instead of extrusion, injection molding the plastic around core pins in an injection mold, then transferring to the blow mold. The fundamental difference between injection blow molding and extrusion blow molding is that with the former, two complete sets of molds are required—an injection mold for molding the preform and a blow mold for the final form.

Until now, polyolefin resins have been the plastics of choice for extrusion blow molding and while injection blow molding can use a greater variety of resins, even including poly(vinyl chloride) resins, not all of them can be substituted into the extrusion blow molding process because of a fundamental lack of melt strength and elasticity.

Most thermoplastics, and even polyolefins, have their shortcomings in extrusion blow molding, expecially if the preformed molten tubes (parisons) are too big and heavy. The tubes stretch and become difficult to handle and special equipment is needed to prevent this hot stretch. Moreover, the parts must often be removed from the blow mold while still warm and supported on special "cool-down" fixtures to avoid tearing, etc.

Other "blow" techniques have in common with the injection blow molding process that the molten polymer is inflated (by air, or a suitable inert gas) to assume its final desired shape. In extrusion blow molding an extruded tube is inflated inside a mold; in blown film extrusion an extruded tube is continuously inflated to a large diameter tube of low wall thickness, which is subsequently collapsed and further processed to yield film, (grocery) bags, etc., and in foam molding or foam extrusion applications a cellular structure is introduced in the plastic through expansion of an inert gas, again requiring high melt elasticity to prevent collapse of the foam before the part has solidified.

In extrusion of profiles of closely controlled shape and dimensions it is important that the molten plastic upon leaving the extruder die does not sag or drool until it has hardened or solidified.

In thermoforming, a sheet of plastic is suspended horizontally over a suitable mold and heated, usually by radiant heat, until melted. The sheet is then brought into contact with the mold and collapsed onto it by suction. After cooling, the plastic, which has assumed the shape of the mold is lifted off, trimmed and decorated as desired.

All of the above described methods require a thermoplastic that has a high melt viscosity which enables the parison, or extrudate to retain its shape until it is properly formed and solidifies via cooling. A solid state polymerization process provides for limited chemical interaction between blended polyesters, while at the same time causing polymerization to continue to cause an increase in molecular weight aan melt viscosity of the product. This leads to the formation of block-copolymers having desirable physical and crystallization properties. Melt polymerization, instead of solid state polymerization, results in extensive interaction between polyesters in a blend, leading to random copolymers of greatly reduced crystallinity. Also, blends of polyesters generally have inferior physical properties due to the inhomogeneity of the material.

It has now been found that a high melt viscosity thermoplastic block co-polyester may be formed by melt blending two low to medium melt viscosity polyesters, and thereafter, subjecting the melt blended polyesters to a temperature that is below the melting component of the blend.

Accordingly, it is a primary object of this invention to provide a novel method of producing a high melt viscosity thermoplastic block co-polyester of two different polyesters that is useful for blow molding, extrusion blow molding and related applications.

It is also an object of this invention to provide a novel method of producing high melt viscosity thermoplastic block copolyesters that include linear polyesters and branched co-polyesters that have a high melt strength which is advantageous for blow molding, extrusion blow molding and related applications.

DETAILED DESCRIPTION OF THE INVENTION

The present invention provides a novel method of preparing a high melt viscosity thermoplastic block co-polyester of a least two different polyesters having repeating units of the formula:

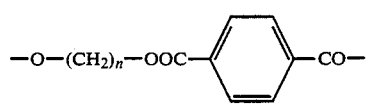

-continued
or

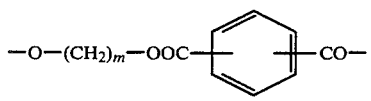

wherein n and m are positive integers between 1 and 10. The method comprises melt blending at least two low to medium melt viscosity linear polyesters, and thereafter, subjecting the melt blended polyesters to a temperature of 10°–50° C. below the melting point of the lowest melting ingredient in the blend until the melt viscosity has increased to at least 10,000 poises at a temperature 10°–15° C. above the melting point of the blend.

It is preferred to continue to heat the blend of the polyesters until the melt viscosity is increased to from 25,000–75,000 poises at a temperature 10°–15° C. above the melting point of the blend.

The linear polyesters are well known and many are commercially available. Methods for their preparation are included in U.S. Pat. No. 2,465,319 to Whinfield, which is hereby incorporated by reference. The high melt viscosity linear polyester compositions may comprise by way of example, from 1–99 parts by weight of polybutylene terephthalate and from 99–1 parts by weight of polyethylene terephthalate; from 1–99 parts by weight of polybutylene terephthalate and from 99–1 parts by weight of polyethylene isophthalate; from 1–99 parts by weight of polybutylene terephthalate and from 99–1 parts by weight of polybutylene isophthalate.

It is preferred to employ as at least one of the polyesters, a branched co-polyester that includes from 0.01 to 5 mole percent, based on the terephthalate units, of units of a branching component which contains at least three ester forming groups. The branching component can be one which provides branching in the acid unit portion of the polyester, or in the glycol unit portion or it may be a hybrid. Illustrative of such branching components are tri- or tetracarboxylic acids such as trimesic acid, pyromellitic acid and lower alkyl esters thereof, and the like, or preferrably, polyols, and especially tetrols, such as pentaerythritol; triols, such as trimethylolpropane; or dihydroxy carboxylic acids and hydroxydicarboxylic acids and derivatives, such as dimethyl hydroxyterephthalate, and the like.

As used herein the term "low melt viscosity" is used to include linear polyesters which have a melt viscosity of up to about 5,000 poises at 10°–15° C. above their melting point and the term "medium melt viscosity" is used to define linear polyesters having a melt viscosity of from 5,000 to 7,500 poises at 10°–15° C. above their melting point.

The branched co-polyesters are especially preferred starting materials because the melt properties are better for a broad number of uses where high melt strength is important. Moreover, such branched materials appear to reach a higher melt viscosity more rapidly than the unbranched, or linear material which can also be used in this process.

The relative amount of branching component can vary, but it is always kept at a minor proportion, e.g., of up to 5 mole percent maximum, for every 100 moles of the tere- or iso-phthalate units in the branched polyester. Preferably, the range of branching component included in the esterification mixture (and, generally, that included in the product), will be from 0.01 to 3 mole percent based on the phthalate units. Especially preferably, it will comprise from about 0.02 to about 1 mole percent, based on the phthlate component.

The generaly procedure for making the starting resins is, first, a condensation in the melt state, using an excess of the alkylene diol and a dialkyl terephthalate or terephthalic acid, or isophthalate or isophthalic acid, and any desired branching component. Then heat (250°–300° C.) and high vacuum (0.2–1.0 mm Hg) are used for a long enough time, e.g., 1–6 hours, to build the molecular weight by eliminating volatile byproducts. It has been found that the resin used as starting material in this solid state process should have a melt viscosity of at least about 500 poises and preferably, less than about 5,000 poises. Moreover, it should be predominantly hydroxyl terminated. If the melt viscosity is below 500 poises the 10,000 poise minimum is not reached, at least in a reasonable time. Both of these requirements are achieved easily, the first by carrying out the condensation for sufficient time until a sample reaches the desired melt viscosity, and the second by using an excess of the diol component in the reaction mixture.

Any suitable apparatus may be utilized as a reactor for carrying out the process. It may be preferred to use a fluidized bed for carrying out the process. The preferred inert gas is nitrogen, although argon, helium or mixtures thereof with or without other suitable non-reactive gases may be employed.

The inert gas mixture is recirculated by a suitable arrangement of piping, blowers and heaters. Means for purging a portion of the inert gas mixture from the recirculating inert gas mixture can be provided in order to permit the removal of volatile reaction products from the recirculating system. Alternatively, with full recycle, a condenser can be provided to selectively remove volatile byproducts from the recycled inert gas mixture. Metered injection of a mixture of an alkylene glycol having from 2–4 carbon atoms such as ethylene glycol, butanediol, etc. may be provided to maintain a vapor pressure of from about 0.2 to about 2.5 mm Hg of glycols in the inert gas mixture. It has been found that an injection rate of 0.05–0.50 ml of 1,4-butanediol per cubic foot of nitrogen gas entering the system may be employed in the process wherein one of the components is poly(1,4-butylene terephthalate).

The compositions prepared by this invention may also include suitable adjuvants and modifiers. These include reinforcing fillers such as from 1–80%, by weight of filamentous glass and effective amounts of flame retardants, mold release additives and the like.

DESCRIPTION OF THE PREFERRED EMBODIMENT

PROCEDURE A 2000 g poly(butylene terephthalate) of low melt viscosity was co-extruded with 2.6 g pentaerythritol (0.21 mole %) to provide an intimate blend. 225 g of the pelletized product (⅛" pellets) was placed in a fluidized bed reactor of 3" diameter and heated to 203°–204° C. in a stream of nitrogen containing 1800 ppm of 1,4-butanediol vapor. After 5 hours, the melt viscosity of the product was 6500 poises at 250° C., measured in a capillary viscometer at a shearstress of 6.2 psi. The reaction was continued without further addition of 1,4-butanediol to the nitrogen stream. After an additional 2 hours reaction time, the melt viscosity increased to 28,000 poises, and 1⅔ hours later to 75,000 poises. The rapid increase in melt viscosity, and the rubbery nature of the clear melt, indicated that the pentaerythritol branching agent had reacted with the polyester under the solid state reaction conditions, at the same time that further polymerization took place. The molten strand from the viscometer crystallized rapidly upon cooling.

EXAMPLE 1

Poly(ethylene terephthalate) (IV=0.58 dl/g) was prepared by the poly condensation of ethylene glycol and dimethyl terephthalate catalyzed by calcium acetate and antimony oxide. No phosphorus containing stabilizers (catalyst inhibitors) were added at any time. One part of this poly(ethylene terephthalate) was blended by extrusion with four parts of a slightly branched poly(butylene terephthalate) of medium viscosity, containing 0.21 mole % pentaerythritol branching agent.

225 g of the pelletized blend was heated in a fluidized bed reactor of 3" diameter in a stream of dry nitrogen. After one hour at 145° C. to dry the material, it had a melt viscosity at 250° C. of 33,200 poises, as measured in a capillary viscometer at a shear stress of 6.2 psi. The extrudate was opaque white, due to the presence of dispersed poly(ethylene terephthalate) which does not melt at 250° C.

The blend was then subjected to solid state polymerization in a stream of $N_2$ containing 1500 ppm 1,4-butanediol at 201°–205° C. causing the melt viscosity to increase to 65,100 poises after one hour and 79,500 poises after a subsequent ¾ hour. The appearance of the molten strand changed during this period from the original opaque white to translucent, due to co-reaction of the poly(ethylene terephthalate) with the branched poly(butylene terephthalate) and the resultant lowering of its melting point. Its crystallization rate upon cooling was noticeably slower than of the product in the first example.

EXAMPLE 2

The poly(ethylene terephthalate)/branched poly(butylene terephthalate) blend described in Example 1 was polymerized in a fluidized bed at 201°–205° C. in $N_2$ containing 3000 ppm 1,4-butanediol. As a result, the melt viscosity levelled off at approximately 50,000 poises after 2 hours' reaction time. Again, the strand of molten product changed from opqaue white to translucent during the course of the reaction.

EXAMPLE 3

A blend of 9 parts poly(butylene terephthalate) of low melt viscosity, 1 part of commercial grade poly(ethylene terephthalate) (Goodyear VFR 3801-A) and 0.21 mole % pentaerythritol was prepared by extrusion. Upon solid state polymerization in a stream of pure nitrogen, as described previously, no polymerization occurred. Evidently, the presence of catalyst inhibiting stabilizer in the commercial grade poly(ethylene terephthalate) interfered with the reaction.

EXAMPLE 4

The experiment of Example 2 was repeated, using poly (ethylene isophthalate) instead of poly(ethylene terephthalate). The rubbery, transparent melt crystallized noticeably slower than the corresponding melts of slightly branched poly(butylene terephthalate) above.

EXAMPLE 5

Example 2 was repeated with substitution of poly(1,4-butylene isophthalate) for poly(ethylene terephthalate). Again, the transparent, rubbery melt exibited a slower rate of crystallization than the unmodified branched poly (1,4-butylene terephthalate).

The foregoing detailed description has been given for clearness of understanding only and no unnecessary limitations are to be understood herefrom. The invention is not limited to the exact details shown and described as obvious modifications will occur to those skilled in the art.

We claim:

1. A method of preparing a high melt viscosity thermoplastic polyester blend of at least two different polyesters having repeating units of the formula:

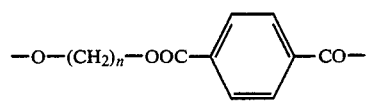

or

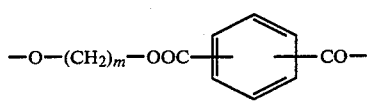

wherein n and m are positive integers between 1 and 10; said method consisting essentially of melt blending at least two low to medium melt viscosity linear polyesters selected from the group consisting of polyethylene terephalate, polybutylene, terephthalate, poly(ethylene isophthalate) and poly(1,4,-butylene isophthalate) and thereafter subjecting the melt blended polyesters to a temperature of 10°–50 ° C. below the melting point of the lowest melting ingredient in the blend in the presence of an inert atmosphere that contains a minor amount of alkylene glycol vapor until the melt viscosity has increased to at least 10,000 poises at a temperature 10°–15° C. above the melting point of the blend.

2. The method of claim 1 wherein said glycol vapor comprises a mixture of glycols that correspond to the glycol component of the linear polyester.

* * * * *